United States Patent [19]

Harada et al.

[11] Patent Number: 4,814,895
[45] Date of Patent: Mar. 21, 1989

[54] IMAGE READING DEVICE

[75] Inventors: Kiyoshi Harada; Motokazu Ikeda; Makoto Kon; Masahiko Matsunawa; Sizuo Morita; Yoshiyuki Ichihara, all of Hachioji, Japan

[73] Assignee: Konishroku Photo Industry Co., Ltd., Tokyo, Japan

[21] Appl. No.: 46,855

[22] Filed: May 4, 1987

[30] Foreign Application Priority Data

| May 15, 1986 | [JP] | Japan | 61-112366 |
| May 15, 1986 | [JP] | Japan | 61-112367 |
| Jun. 18, 1986 | [JP] | Japan | 61-143687 |
| Jun. 18, 1986 | [JP] | Japan | 61-143688 |

[51] Int. Cl.$^4$ ............................................... H04N 5/30
[52] U.S. Cl. ....................................... 358/229; 358/44; 358/75
[58] Field of Search ........................... 358/229, 75, 44

[56] References Cited

U.S. PATENT DOCUMENTS

| 4,196,009 | 4/1980 | Martin et al. | 358/44 |
| 4,266,017 | 5/1981 | Martin et al. | 358/44 |
| 4,315,279 | 2/1982 | Kuwayama et al. | 358/44 |
| 4,566,029 | 1/1986 | Johnson | 358/229 |
| 4,644,390 | 2/1987 | Ochi | 358/229 |
| 4,667,227 | 5/1987 | Ikeda | 358/75 |
| 4,667,250 | 5/1987 | Murai | 358/75 |

Primary Examiner—Russell E. Adams
Attorney, Agent, or Firm—Jordan B. Bierman

[57] ABSTRACT

An object of the invention is to provide a color image reading device having a lens unit for introducing an color image, an optical prism for separating the color image into a plurality of optical image components, and a plurality of CCDs for converting the optical image components into image signals in which the CCDs are attached to projection surfaces of the optical prism by using adhesive materials.

25 Claims, 9 Drawing Sheets

FIG. 2
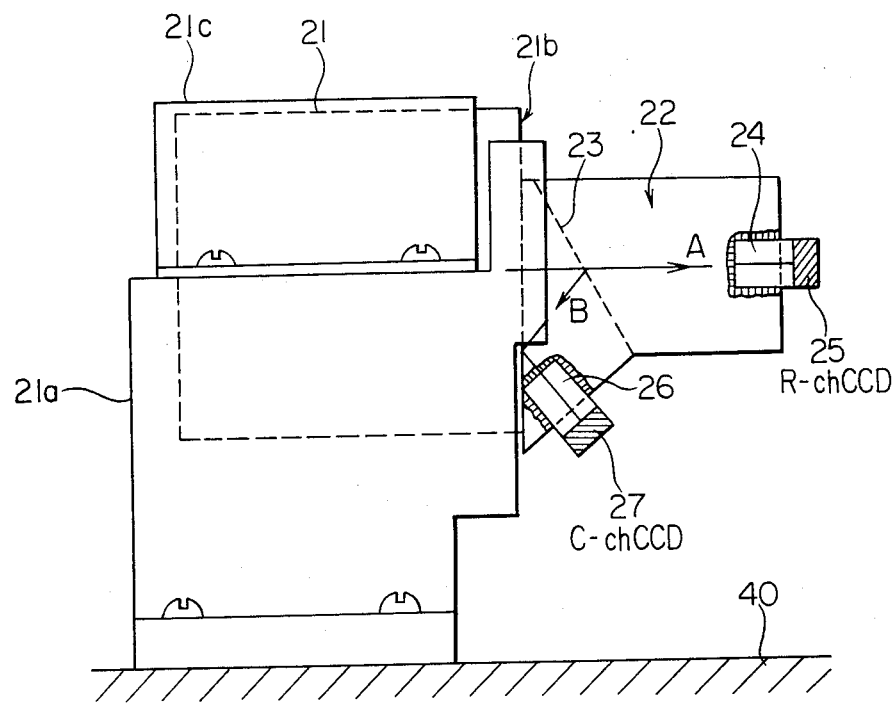
2-a
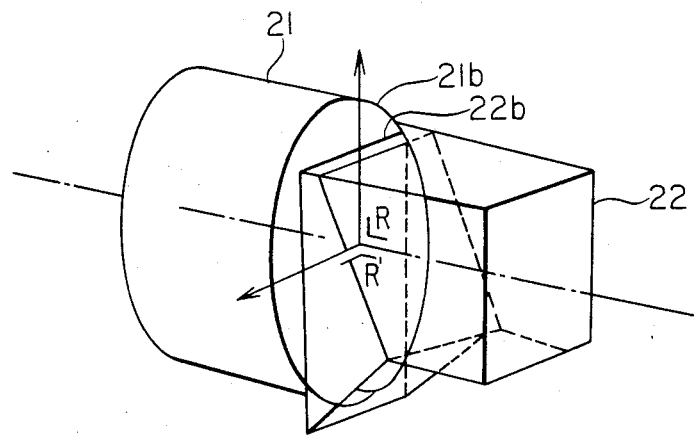
2-b

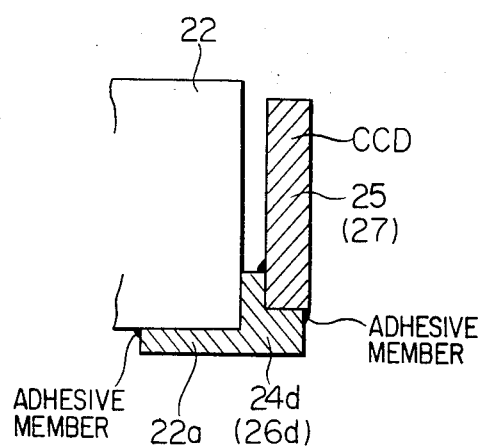
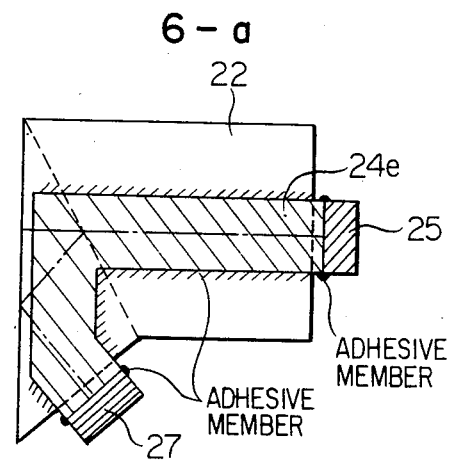
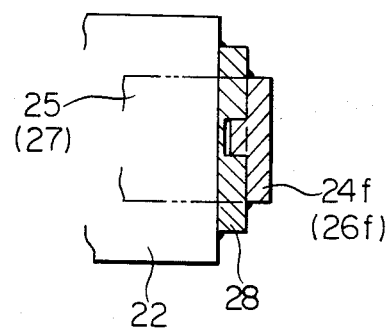
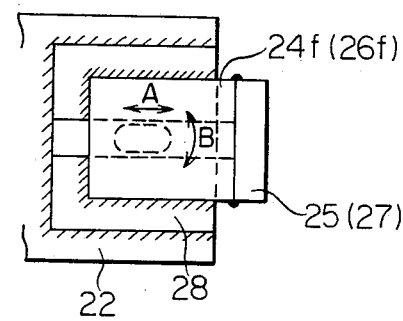

FIG. 6
6-b
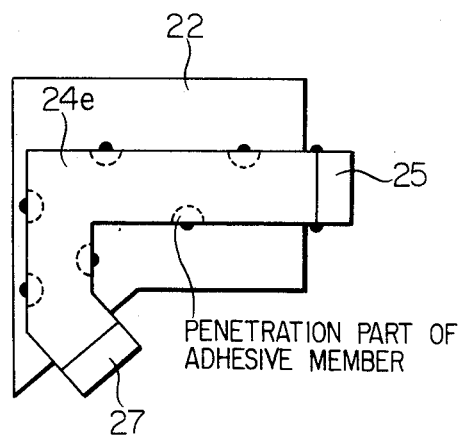
6-c
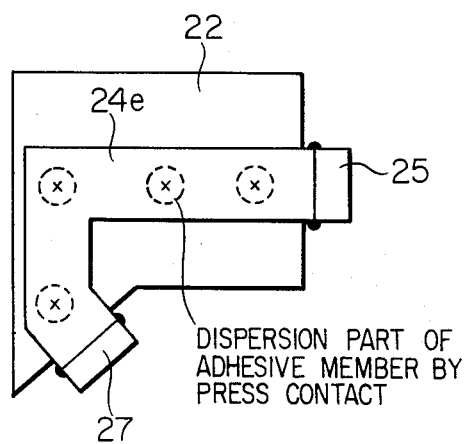

FIG. 8
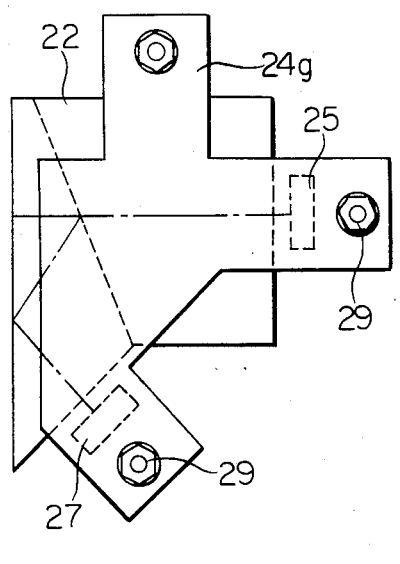
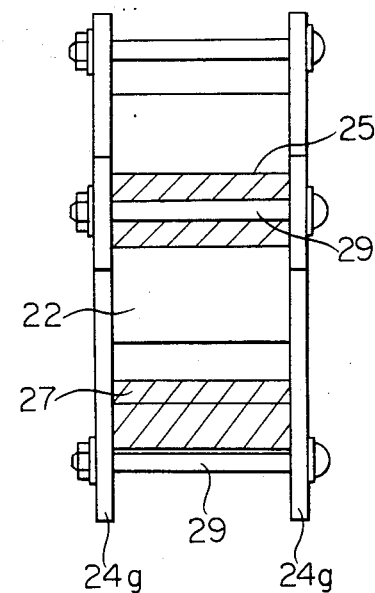
FIG. 9
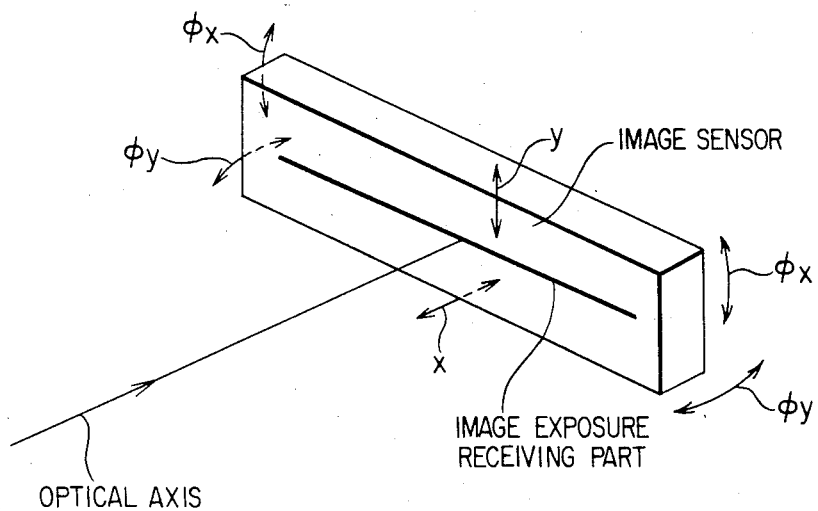

FIG. 12
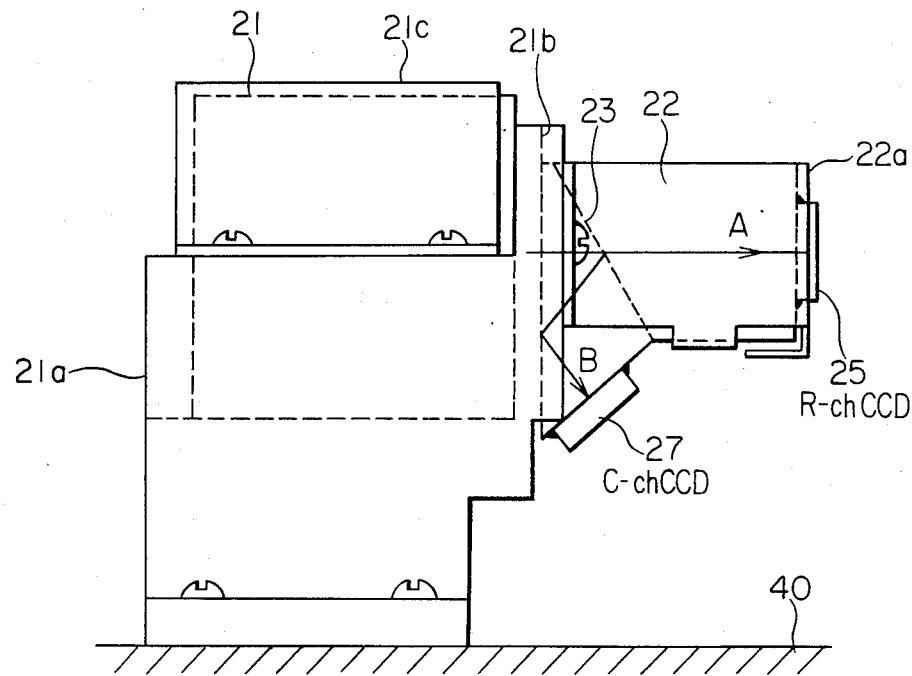
FIG. 13
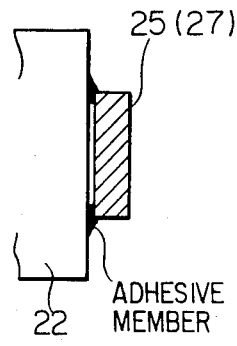
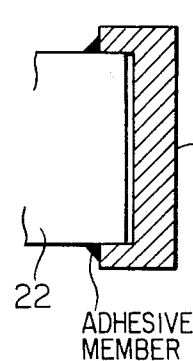
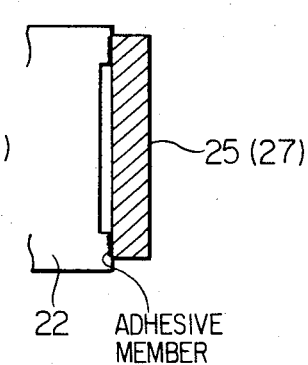

IMAGE READING DEVICE

BACKGROUND OF THE INVENTION

The present invention relates to an image reading device that reads images in an image-forming apparatus such as a facsimile, a copying machineaand a printer and images in an image-pick-up device such as a telecamera and others, and more particularly to an image reading device provided with an image-reading unit wherein light images or optical images are read from a document illuminated by means of a solid image-pick-up element (or a solid state image sensor) such as CCD through an optical member such as a dichroic prism or the like.

For example, a color image forming apparatus, especially a color image forming apparatus in a digital system is composed generally of a color image processing device such as an image reading device and an image writing device. The image reading device, for example, separates light images obtained from the document by an exposure scanning, after causing them to pass through the image forming lens system for reading, into a plurality of light by means of a light separating means located behind the image forming lens system. In the case where images are formed on a line image sensor consisting of a solid image-pick-up element that receives light in each channel after separating into red (R) and cyan (C), for example, each line sensor needs to be mounted after the sufficient adjustment of the position and the perpendicularity for each spectral optical axis, so that light images from aforesaid lens system for reading may be formed correctly. Namely, when light images on each line image sensor are not corresponded correctly with each other, it adversely affects the reproduced images reproduced by the writing device. Since the solid image-pick-up element (e.g. line image sensor TCD 106C made by TOSHIBA) is so composed as to obtain anaarrangement of picture elements each of which is about 7 $\mu$m in size, other coloss appear as a fringe on the periphery of a reproduced image when the correspondence of the light image incidenting upon aforesaid image sensor in theeexample in FIG. 1 described later deviates over a quarter picture elements (approx. 2 $\mu$m), for example. a color ghosts in red, blue or other colors appear on the periphery of characters and figures in black. Especially when a deviation of 1 picture element (approx. 7 $\mu$m) or more takes place in aforesaid correspondence, the influence is remarkable. For preventing the color ghost, electric corrections have been generally made. However, when the most of color ghosts are intended to be prevented by means of an electric process, the capacity of memory for the process needs to be very large. And, image-wise problems that thickness of line image varies, for example, take place and it is not a perfect one because of the technical difficulties, which represents unsolved problems from the commercializing viewpoint.

The inventor of this invention has made a proposal through Japanese Patent Application No. 239174/1985, as to a means for preventing the deviation between picture elements of image sensors. In the proposal, each of solid image-pick-up elements 51a and 51b is fixed on each of base plates 52a and 52b to be a unit respectively as shown in FIG. 11, and they are capable of being adjusted, as shown in FIG. 9, both in directions to two axes of x and y orthogonalized each other spacially and inrrotating directions around x and y axes, thus the units may be adjusted and fixed mechanically. Aforesaid proposal enables each solid image-pick-up element to be adjusted finely for fixing thereof and immediately after the adjustment, the correspondence between elements showed that they were mostly registered. As shown in FIG. 11. however, light-separating prism 54 that is an optical member and is provided behind the condenser lens 53 and solid image-pick-up elements 51a and 51b are mounted respectively on the frame and there are many holding members between teem, such as the supporting units adjusted and fixed with adjusting screws which easily cause the deviation in positioning due to expansion or shrink depending on the temperature variation and the screws adjusted improperly and having teeir plays and errors, and it was not easy to solve the problems of the deviation of picture elements including the stability thereof. Especially when the solid image-pick-up element that is of a mechanical structure is held and fixed by means of precision screws, since a fine adjustment in the order of $\mu$m while applying the tightening force of aforesaid precision screws onto the solid image-pick-up element is necessary, it is very difficult to secure the precision. Further, even when the solid image-pick-up element is fixed fairly tightly by using the jig, it easily moves by several $\mu$m or more due to the restoration of the distortion upon releasing from the jig after tightening it with the torque for final setting by screws. And even when the image-pick-up element is set precisely within the accuracy of 1 $\mu$m, an occurrence of the deviation of several $\mu$m or more was observed in the impact test, due to the strain caused by stress in it's parts. Furthermore, the disadvantage of an occurrence of error caused by the coefficient of thermal expansion was observed after the temperature test.

Further, it has been proposed, for fixing the solid image-pick-up element, to fix it by the use of the adhesives in Japanese Utility Model Application O.P.I. No. 57670/1982. This proposal, however, relates to the fixing of a single solid image-pick-up element and it is not for the fixing to the optical member. It is for adjusting-/fixing the solid image-pick-up element to the frame and, in this fixing, an amount of the adjustment is compensated by filling the adhesives, therefore, it may not be applied to the image-reading apparatus having a plurality of image-pick-up elements that requires the high precision wherein no deviation for positioning is allowed.

SUMMARY OF THE INVENTION

In a color image processing apparatus, especially in a color image reading apparatus wherein a plurality of solid image-pick-up elements are arranged at the image-forming position of the device such as prisms forming a part of an optical member, a device composed of aforesaid prisms and lenses, a light-separating means by means of prisms and semi-transparent mirrors, and a device composed of the prisms, the semi-transparnnt mirrors and lenses, and wherein images formed by each solid image-pick-up element are read and signals are processed. it is necessary that the reading device having a high resolving power is provided and the images formed by each solid image-pick-up element are precisely registered each other. An object of the invention is to provide a color image reading device wherein relative positional deviation among solid image-pick-up elements is prevented and images may be read stably under all conditions of temperature variation, change with the passage of time, vibration and impact.

Aforesaid object may be attained by an image reading device for reading light images by means of solid image-pick-up elements provided at the image-forming position of an optical system, wherein aforesaid solid image-pick-up elements are attached firmly to aforesaid optical member that forms a part of aforesaid optical system.

BRIEF DESCRIPTION OF THE DRAWINGS

FIG. 9 represents a perspective view showing how the image sensor is adjusted.

FIG. 10-b is a perstective diagram wherein a dust-proof member is used for trial between a prism and a solid image-pick-up element.

DETAILED DESCRIPTION OF THE INVENTION

Figure 1:
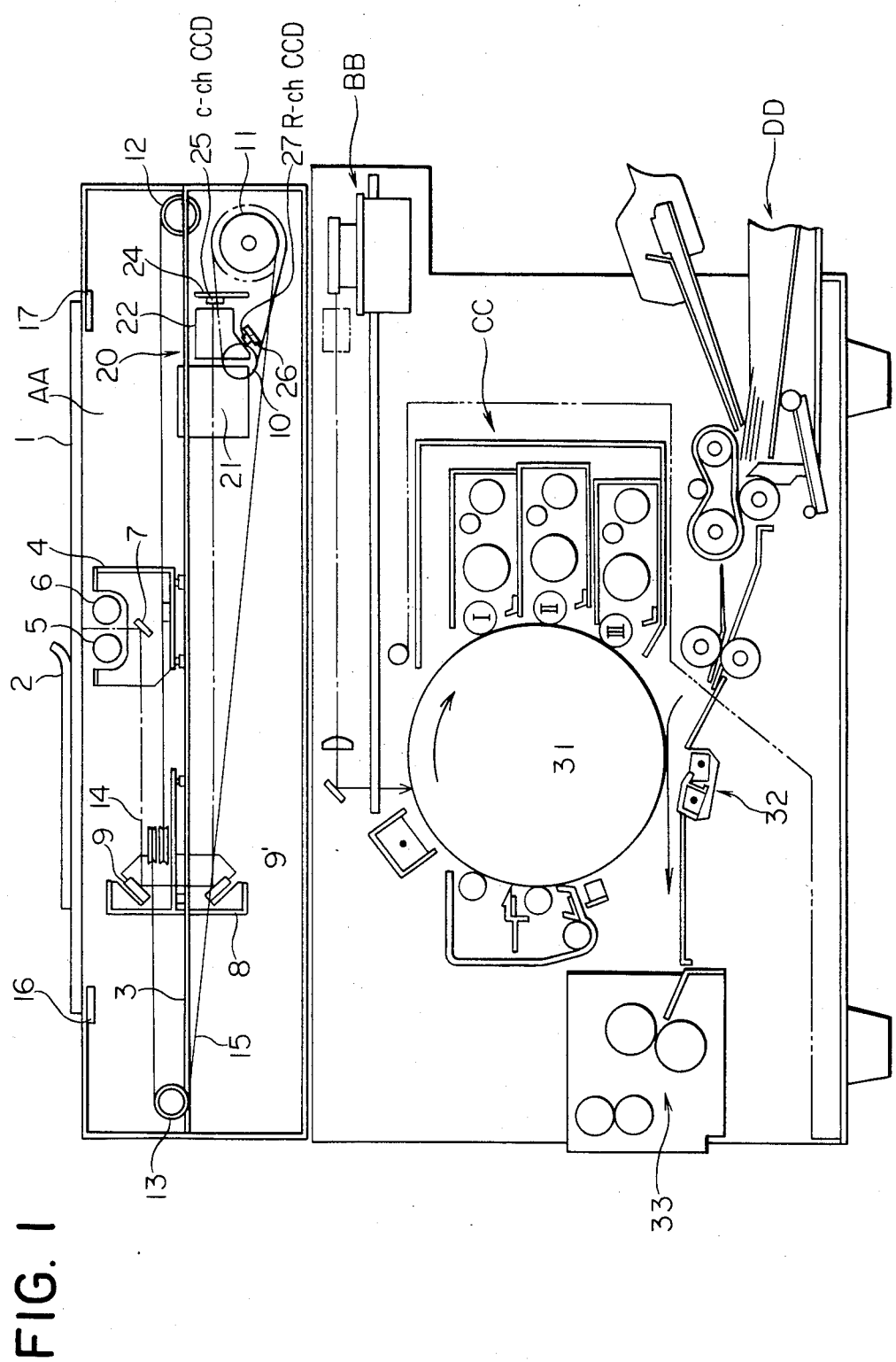
FIG. 1 is a schmmatic diagram of a color image-forming apparatus provided with a color image reading device of the invention.

The image-forming apparatus provided with a color image reading device of the present invention will be explained as follows, referring to FIG. 1. In the figure, AA represents an image reading device having therein a reading unit, BB, a writing unit, CC, an image-forming unit that constitutes an color image processing apparatus and DD is a paper feed unit.

In the image reading device, numeral 1 represents a platen glass and document 2 is placed on the platen glass 1. The document 2 is illuminated by fluorescent lamps 5 and 6 provided on a carriage that travels on the slide rail 3. Being provided with mirrors 9 and 9', the movable mirror unit 8 travels on the rail 3 and guides the light image of the document 2 placed on platen glass 1 to the lens reading unit 20, cooperating with first mirror 7 provided on carriage 4.

Carriage 4 and movable mirror unit 8 are driven in the same direction at the speed of V and ½V respectively by pulleys 11, 12, 13 and 14 driven by the stepping motor 10 through the wire 15. Reference white plates 16 and 17 are provided on reverse side at both edges of platen glass 1 and it is so constituted that reference white color signals are obtained before the start of scanning for reading document and after the completion of the scanning.

The lens reading unit 20 is composed of lens 21 as a lens system for reading, prism 22 as a color-separating means, red channel (hereinafter referred to as R-ch) CCD 25 as a line image sensor and cyan channel (hereinafter referred to as C-ch) CCD 27 as also a line image sensor. Light image from the document transmitted through the first mirror 7, mirror 9 and mirror 9' is converged by the lens 21, separated by the dychroic mirror provided in the prism 22 into R-ch image and C-ch image, and each light image is formed respectively on the light-receiving surfaces of R-ch CCD 25 and C-ch CCD 27 fixed on the prism 22 through the attaching members 24 and 26.

As aforesaid fluorescent lamps 5 and 6, warm white type fluorescent lamps on the market are used for the purpose of preventing the enhancement and attenuation of a particular color caused, during reading the document, by the light source and they are lit by the high frequency power source of 40 KHz for preventing their flickering and further they are warmed by the heater employing therein a posistor for keeping the tube wall at the constant temperature or for accelerating the warm-up.

Image signals outputted from aforesaid R-ch CCD 25 and C-ch CCD 27 are processed through the unillustrated signal processing means and color signals separated to be corresponded with toner colors are outputted and then inputted in the writing unit BB. Then, image-wise exposing beam by means of each laser beam generated from the semiconductor laser is projected in succession onto the surface of photoreceptor drum 31 and developed for each projection by aach of developing rollers I, II and III, thus the color imageiis formed with 3-color toners.

Then, the color image on the surface of aforesaid photoreceptor drum 31 is transferred, at the transfer-separating electrode 32, onto a copying paper transported from paper feed means DD and the copying paper is separated and is conveyed through the fixing unit 33 to be delivered from the apparatus, thus the reproduction of a color image is completed.

Figure 2:
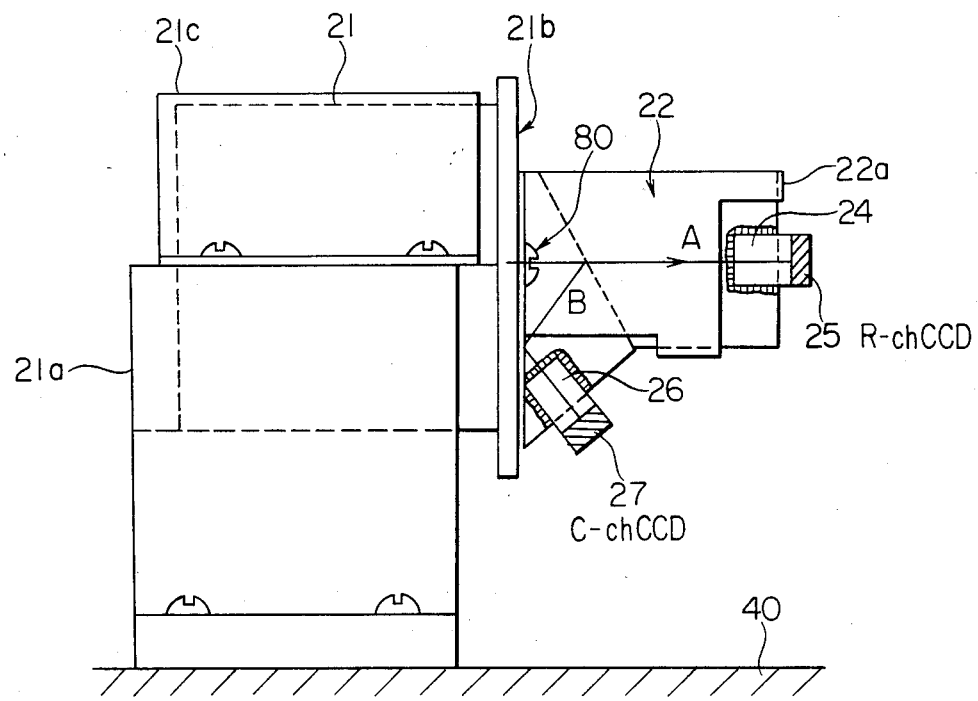
FIGS. 2-a, 2-c, 3, 5, 6, 7, 8, 12 and 13 are an explanatory drawings showing examples of how prisms and solid image-pick-up elements are attached firmly in the invention, and FIG. 2-b is a perspective view showing the combination of a lens barrel and prisms.

FIG. 2-a represents the first example of attaching arrangement (other examples will be mentioned later) for the image sensor of the invention incorporated in aforesaid lens reading unit.

The numeral 21 represents a lens in the reading lens system attached on supporting member 21a and fixed on the apparatus base board, 22 is a prism being fixed behind aforesaid lens 21 and the prism 22 separates, through the dichroic mirror 23 provided therein, the document image converged by aforesaid lens 21 into the spectrum A of R-ch image and the spectrum B of C-ch image both of which are formed respectively on the light-receiving surfaces of line-image sensors, R-ch CCD25 and C-ch CCD27 fixed with adhesives (adhesive member) through fixing members 24 and 26 on the prism 22 that is an optical member, in aforesaid constitution.

The structure of lens reading unit 20 in aforesaid reading device AA, namely, aforesaid lens barrel 21, prism 22. R-ch CCD25 and C-ch CCD27 are fixed and held as follows.

Aforesaid lens barrel 21 is rested in the V-shaped receiving portion that opens at right angles toward the upper part of holding member 21a, fixed with clamping metal fittings 21c and then is mounted at a prescribed position on the base board 40 as shown in FIG. 2-a.

In the present invention, the rear side of aforesaid holding member 21a is prvvided with attaching surface 21b with where the front surface of aforesaid prism 22 can be fixed by bonding manner with adhesives.

Since aforesaid attaching surface 21b may be formed through a machining, it's distance from image-forming lens being accommodated in the lens barrel 21 and it's perpendicularity to the optical axis are very high in accuracy, thus the prescribed light images may be formed correctly on the light-receiving surface of aforesaid R-ch CCD25 and C-ch CCD27 through prism 22 attached on the attaching surface 21-b.

An influence of errors in the fitting angles R and R', as shown in FIG. 2-b, of plane 22b of the prism 22 which is to be attached to the plane 21b of the lens barrel 21 in the way of being at right angle vertical and horizontal to the optical axis of lens can be examined by resolving power (MTF: Modulation Transfer Function) capable of being obtained by using single outputs of black stripe and white stripe against white region as shown in FIG. 10-a.

Figure 10:
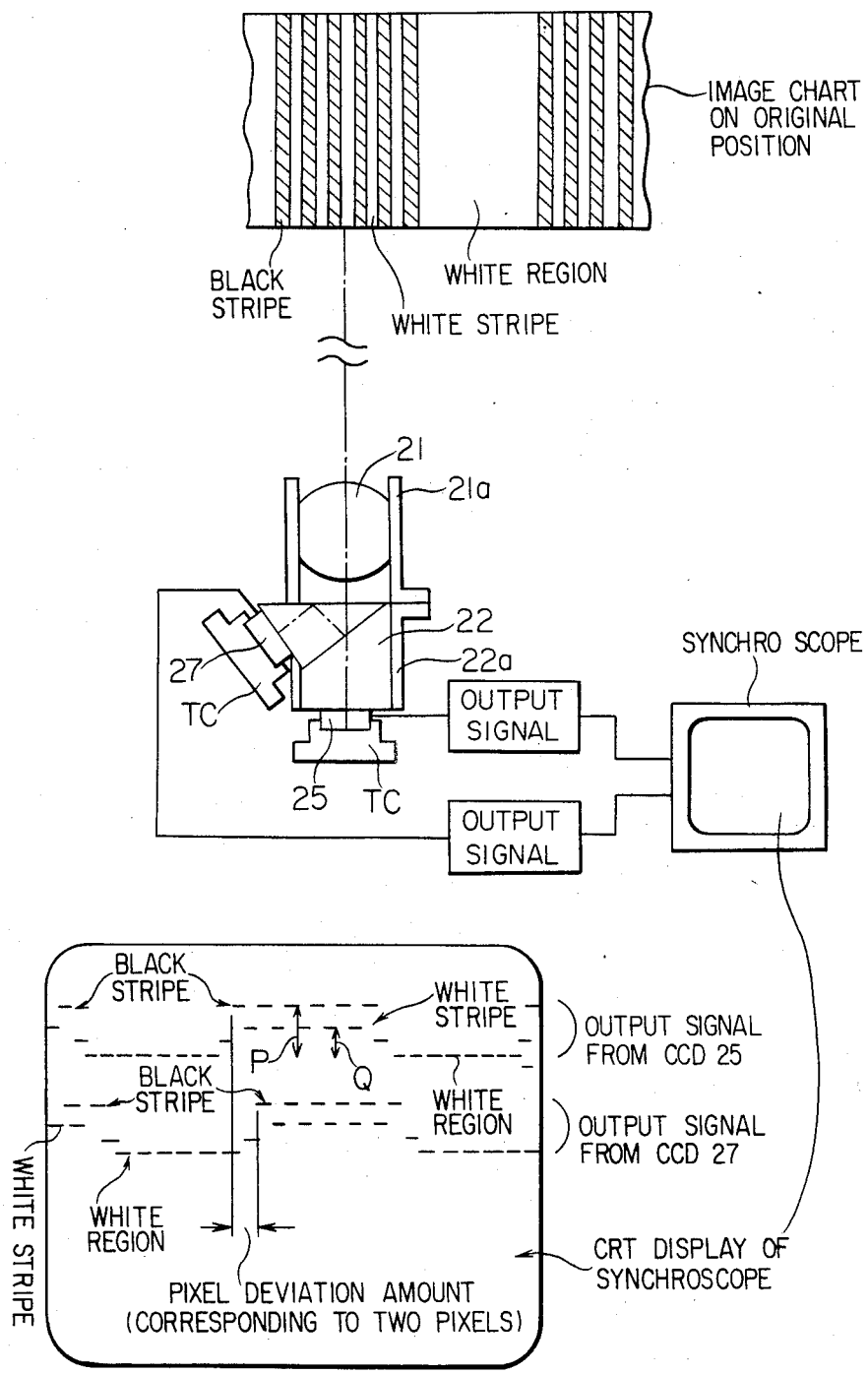
FIG. 10-a is an explanatory diagram showing the way of adjusting a solid image-pick-up element of the invention.
Figure 10:
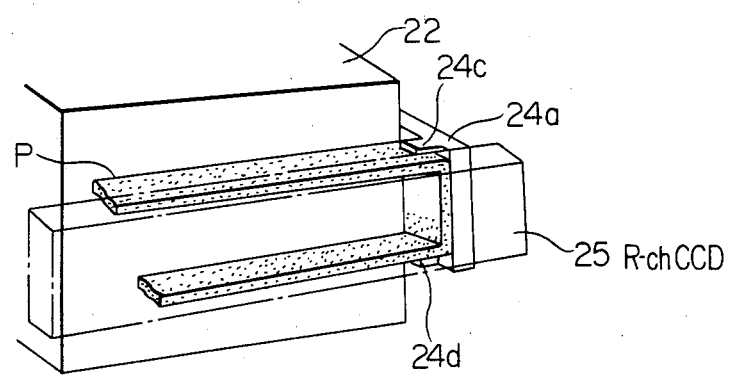

FIG. 10-a indicates a checking method for pixel deviations between CCD25 and CCD27, the detailed explanation about the method will be mentioned later.

As indicated on the CRT display in FIG. 10-a, assuming the signal levels of the black stripe and the white stripe against the white region as being P and Q, the resolving power (MTF) can be obtained by following formula.

$$(MTF) = (P-Q)/(P+Q) \times 100 \ (\%).$$

Higher the value of MTF is, higher resolution the displayed image can be obtained.

Now, assuming the value of MTF being 30% and then taking one example of the influence of errors in the fitting angle against the MTF (30%);

when the errors deviating from right angle is 1/6 degree in angle, the MTF value may be lowered to 21% being reduced 9%, and when the errors further deviates to about 0.5 degree, the MTF value may be lowered to 15% being reduced to the half value thereof.

Since the above errors causes the resolving power to be lowered remarkably, thereby further causing troubles in taking out black/white judging signals, therefore, it is important to maintain the surface accuracy.

Fixing the lens barrel 21 and prism 22 to be one body in advance for the purpose of maintaining the uurface accuracy prevents the drop of yield in the later step of production, offers the advantage in cost and reduces the adverse influence on the deviation of picture elements after attaching CCD caused by the material of holding member 21a and attaching member 24 for the further effect.

For sticking the prism 22 on aforesaid lens barrel 21, the adhesives which stand the test of adhesive strength and various kinds of environmental tests are selected for use. In the present example, however, the same adhesive can be used for sticking CCDs 25 and 27 on the prism 22 stated later, therefore. the characteristics of the adhesive will be explained totally in the item which illustrates the way of attaching and fixing aforesaid CCDs 25 and 27.

As a method of fixing in place of the above method of bonding, the rear side of the holding member 21a is provided with an attaching surface 21b where the front surface of the prism 22 can be pushed in, and the prism 22 held by a holding member 22a can be pressed and fixed by means of screw-setting with set screws 80 as shown FIG. 2-C.

On the other hand, following two ways have been propose as a method for attaching aforesaid CCDs 25 and 27 on the prism 22.

In the first method of them, the attaching is made by means of adhesives through attaching members 24 and 26, as shown in FIG. 2-a.

Figure 3:
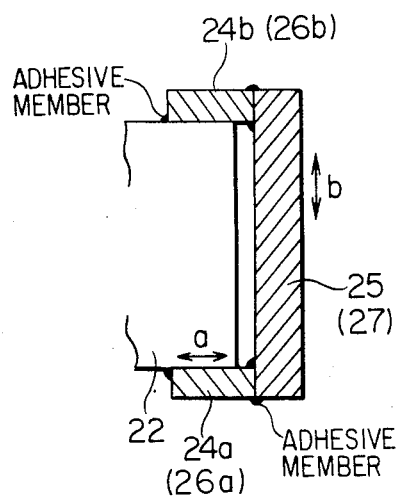

FIG. 3 represents an example showing a sectional view of a main portion wherein CCD25 (27) is fixed by means of adhesives at the image-forming position through attaching members 24a and 24b (26a, 26b) attached symmetrically with adhesives at both sides of the prism 22 that is a light-separating member. In this method, it is possible to stick the attaching member to the edge of CCD after pressing them more closely each other than in the occasion of the method of sticking a plurality of edges of CCD shown in FIGS. 4 and 6-a. thus, the contact area for sticking between the attaching member and CCD is larger and it gives the better influence on the deformation caused by the hardening of adhesives.

Figure 4:
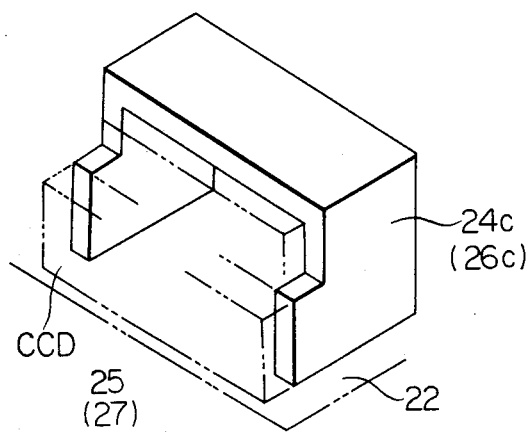
FIG. 4 is a perspective view showing an example of a mounting member.

FIG. 4 shows a attaching member wherein the attaching members 24a and 24b (26a, 26b) provided symmetrically on both sides of aforesaid prism 22 are united in a body and the bridge-shaped attaching member 24c (26c) is fixed firmly on prism 22 by means of adhesives in a form that the attaching member stands straddling the prism, and CCD25(27) can be fixed by means of adhesives on the points corresponding to both sides of the attaching member.

In the aforesaid examples, CCD25 (27) is always fixed on the arm-shaped attaching portions at both sides. For the plural fixing edges of CCD, however, a certain edge can be fixed closely but other edges may not necessarily be fxxed closely as stated above. Therefore, the structure wherein the fixing on one surface is made by the use of one attaching member is preferable on the point of contacting or glueing. FIG. 5 represents an example wherein CCD is fixed by means of an attaching member of a cantilever type. In the example, attaching member 24d (26d) is fixed by means of adhesives on one side of the prism 22 which is an optical member and CCD25 (27) is fixed at the image-forming position on the attaching member 24d (26d) by means of adhesives. In this method, bending or inclination caused by the type of a cantilever is feared when glueing add fixing plural elements with a reference of the edge of the attaching member 22a, but when this problem is removed, as the start point of thermal expansion becomes clear, the same supporting method for plural solid image-pick-up elements does not create the deviation of picture elements.

Further, in aforesaid example, each CCD is fixed at the image-forming position by means of each attaching member, while FIG. 6-a shows an example wherein common attaching member 24e is glued and fixed on prism 22 and CCD25 and CCD27 are glued and fixed on the common attaching member 24e.

As a material of an attaching member, the material whose coefficient of linear expansion is small is preferable for too reasons. One reason is to cause the deviation of picture elements resulted from the temperature variation not to be created and the other reason is to prevent the phenomenon wherein the internal strain is created in the attaching member glued on the prism due to the difference of the coefficinnt of linear expansion between the attaching member and the prism and thereby the crack or the like is produced in the prism. Aforesaid problem of the deviation of picture elements between CCDs caused by the temperature variation may be reduced by causing the condition for fixing each CCD on the attaching member to be exactly the same each other, but the coefficient of linear expansion further needs to be small. Since the coefficient of linear expansion of a prism is usually as small as about $7.4 \times 10^{-6}$ (optical glass BK-7), as the attaching member, glass, ceramic material ($7.0 \ 8.4 \times 10^{-6}$), low thermal expansion alloy (e.g. Invar alloy $\{1-3 \times 10^{-6}\}$ and Ni-resist cast iron $(4-10\times10^{-6})$} are preferable and aluminum material is not so suitable. Inventors of the present invention made tests for various materials as an attaching member and observed no detectable deviation of images caused by the thermal expansion when glass materials, other ceramic materials and low thermal expansion alloy were used.

In the above-mentioned example, adhesives were used for the fixing between prism and attaching member and between attaching member and CCD and fixing by means of adhesives was made in FIG. 5 after the positional adjustment of each CCD for separated light images. Especially in FIG. 3, no deviation of picture elements was observed in such a constitution despite iron whose coefficient of linear expansion is high $(12\times10^{-6})$ used as an attaching member because the dimension in 'a' direction is short and thermal expansion has little influence, 'b' direction is one for arranging line sensors in a row and further the material of prism, and the material of package for line sensors are ceramic material, thereby their coefficients of linear expansion are mostly the same.

Using various types of adhesives available, the inventors of the invention made comparative studies. As a result, it was concluded that 2-liquid type adhesives and light-hardenable adhesives are preferable and ultraviolet ray-hardenable adhesive is most preferable.

As adhesives to be used, epoxy type adhesives and acryl type adhesives are available and they are further divided into 1-liquid type adhesives and 2-liquid type adhesives. In 1-liquid type adhesives, hardening agents are usually mixed thereto in manufacturing process therefor and when they are used, they are gradually hardened and dried for solidification as they are exposed to air, and a special instrument for glueing and fixing is needed for the reasons such as a hardening time is long and the shrinkage during hardening are irregular. Therefore, 1-liquid type adhesives are considered to be unsuitable from the viewpoint of the purpose of application of the invention and the productivity of the adhesives. In this connection, in case of 2-liquid type adhesives of a quick acting type, it is possible to shorten the hardening time to about a few minutes by mixing and kneading hardeners and primary agents when glueing and to stabilize the extent of hardening, thus it conforms effectively to the object of the invention. Incidentally, 1-liquid type cyanoacrylate adhesives of a quick acting type is available, but the tear of adhesion takes place in the glued portion when it is exposed to the impact and deformation of glued objects takes place being caused by the shrinkage of adhesives that is created when adhesives are dried, thus, it is considered to be unsuitable for the invention. The inventors of the invention used HARD-ROCK E510K (brand name) as 2-liquid type adhesives and conducted glueing under the room temperature and obtained the results which were satisfactory for the environmental tests that will be stated later. Incidentally, during aforesaid glueing. attempts were made to shorten the glueing time by changing remarkably the temperature conditions. As a result of the attempts, the deviation of picture elements was observed slightly during glueing, which proved to be undesirable.

Contrary to the foregoing, it is possible to shorten the hardening time of adhesives by a simple method of adjusting the intensity of the light for the light-hardenable adhesives, and it is possible to improve the workability, to reduce the cost and to stabilize the quality of products. Among light-hardenable adhesives, ultraviolet-hardenable adhesives, in particular, hardly cause the temperature fluctuation therein even when they are subjected to the illumination by ultraviolet rays, thus, the effects thereof are stable. As light-hardenable adhesives, the ineventors of the invention used adhesives of Three-Bond TB3060B (brand name), Denka1045K (brand name) and Noland65 (brand name) and conducted glueing in a short time under the ultraviolet-illumination by means of a high pressure mercury lamp and obtained the results satisfactory for the environmental tests described later. Further, the adhesives of a ultraviolet-hardenable type such as Three-Bond3062B (brand name) and LT350 (brand name) were used and it was cleared that they are more effective for the moisture resistance and they ensure the adhesion that guarantees the strength. In the adhesion method wherein aforesaid adhesives are used, opposing surfaces of objects to be glued are pressed each other and a small amount of adhesives are injected through a proper injecting means into aforesaid opposing surfaces from the side of the pressed opposing surfaces. Since aforesaid adhesives have their fluidity, they flow into the small clearance formed between the opposing surfaces, and stick the objects to be glued firmly. As a glueing method, adhesives may be injected to flow into the clearance so that entire area of opposing surfaces are glued. Further, optimum intervals may be provided for the injection of adhesives. Further, when a device capable of positioning accurately the objects to be glued is used, adhesives may be applied on the glueing surface of each object to be glued in a form of a dot or area in advance, and then the glueing surfaces of the objects to be glued may be pressed each other immediately for adhesion.

Preferable examples of the method of glueing will be explained as follows.

FIG. 6-b and FIG. 6-c represent CCD 25, CCD 27 and the common attaching member 24e for the CCDs 25 and 27 in FIG. 6-a. When glueing the attaching member 24e on the prism 22 shown in FIG. 6-a, the method which is considered is one wherein the attaching member 24e is fixed at the predetermined position on the prism 22 and then adhesives are applied on the edges of the attaching member 24e through the method of potting so that the adhesives penetrate and spread between the glueing surfaces facing each other as shown in FIG. 6-b. In this case, when light-hardenable adhesives are used as an adhesive agent and light-transmittable substance is used as the material of the attaching member, the usage of the light-hardenable adhesives is more effective. Namely, the transmitted light may accelerate the hardening of the adhesives formed to be a thin layer between the glueing surfaces through the penetration after aforesaid potting on the edges. Further, as shown in FIG. 6-c, even in a general glueing method wherein adhesives are applied either on an attaching member or on an opposite member and then both members are pressed each other, the adhesive strength higher than that in potting method is attained and the acceleration of hardening of adhesives caused by transmitted light in addition to natural drying and the control of the period of time or the like are further achieved by the use of light-hardenable adhesives and a light-transmittable attaching member. Therefore, a stable productivity and an stable adhesive strength without uncertainty are obtained, which means a very preferable measure. As a light-transmittable attaching member, BK-7

($7.4 \times 10^{-6}$), a blue sheet glass ($9.0 \times 10^{-6}$) and a white sheet glass ($9.3 \times 10^{-6}$) among aforesaid glass and ceramic are equally preferable in particular, corresponding to the growth of ceramic used as a packaging material for a solid image pick-up element. Further, as a light-hardenable adhesive agent, aforesaid ultraviolet-hardenable one is fast in hardening and is preferable from the viewpoints of deformation in hardening and of moisture resistance. In this case, the transmittance of 20%-30% in which a processing method and the dispersion of sheet thickness are considered may be obtained even when aforesaid BK-7, a blue sheet glass or a white sheet glass is used, which is especially preferable from the aspects of productivity and production cost. Furthermore, it is possible to select, as an attaching member, the special glass whose spectral distribution characteristics in the ultraviolet range are matched with those of ultraviolet-hardenable adhesives and it is further possible to obtain the optimum one for the apparatus to be used by bringing the factors including the productivity for glueing and the stability for adhesive property such as the necessary adhesive strength, the extent of hardening and hardening time close to the optimum values.

Incidentally, as explained previously, one-liquid type adhesives among the adhesives having quick effects shrink when they are dried and cause the deformation on an object to be glued, thus they are not the preferable application. Through the preferable examples of the inventors of the invention, however, it has been found that one-liquid type adeesives having quick effects may also be used effectively provided that the procedure for attaching an object to be glued is improved.

Namely, when mounting CCDs on an optical member (prism or the like) thoough an attaching member, firstly the position of CCDs to be fitted on the optical member is adjusted by a positioning procedure according to the invention which will be mentioned later. Next, the quick acting type adhesive having a quick dryability (cyanoacrylate adhesive may be preferred for this purpose) is applied on the one surface of the attaching member to be fitted with the optical member and the beforementioned preferable adhesives, that is, the two-liquid type adhesive (such as HARD-ROCK E510K and so) or the light-hardenable adhesives (such as Three-Bond TB 3060B and so on) is applied on the other surface of the attaching member to be fitted with the CCDs, and then CCds are mounted on the optical member by this attaching member.

After the attaching member comes into rigid contact with the optical member by the effect of the quick dryable adhesive in which the process of obtaining the rigid contact may be referred as the preliminary fixation in this embodiment, a fine adjustment for the position of the CCDs is carried out so as to obtain the correct positions having no pixel deviations by using a positioning instrument latermentioned in detail, and then a hardening process for the adhesives applied between the CCds and the attaching member is promoted.

Lastly, at the stage where the above hardening process procedds to the appropriate extent, the attaching surface having the rigid contact portion between the attaching member and the optical member is further strengthened by being applied with the above-mentioned preferable adhesives in the manner of potting and the like in which the process of strengthening the rigid portion may be referred as the final fixation, thereby further hardening the attachnng surface between the attaching member and the optical member in addition to the above rigid portion.

As the above embodiment according to the invention adopts the process of the preliminary fixation for the attaching member and the process of the fine adjustment for the position of the CCDs, it may be possible to increase the yield rate to be 50% higher than that according to the method of simultaneously fixing the optical member and the CCDs with the adhesives afte positioning both member, thereby attaining to improve the efficiency of the working condition and to remarkably reduce the producing cost.

A fixing jig TC according to the invention is to be prepared for glueing CCD25 and CCD27 to the prism 22.

Aforesaid fixing jig capable of holding the sides of CCD25 and CCD27 provides easy adjustment of the CCDs with respect to the optical axes, such as two directions of x and y which are axial and perpendicular to the optical axes respectively and rotating directions around x and y axes as shown in FIG. 9, relating to each optical axis of separated light A and B as shown in FIG. 10-a. Through the fine adjustment on the fixing jig TC, an adjustment for preventing the deviation of picture elements may be made.

A precise positioning of each of plural CCDs for assuring their relational positions which is one of the objects of the invention is attained by using, as an attaching jig, a positioning tool (made by CHUO SEIKI CO., LTD.) wherein an adjusting table is movable in the directions of three axes (X,Y and Z) and is further rotatable round each of the axes.

Chart images of black and white stripes placed at the document position are to be formed on CCD25 and CCD27 respectively and output signals therefrom are recorded on a synchroscope in a juxtapose mode. When a chart is prepared by means of the designed reduction ratio by the condenser lens 21 and the size of picture element of CCD so that a line of the stripes corresponds to one picture element, it is possible to read easily an amount of deviation of picture elements from recorded signals superposed side by side on the synchroscope. For example, the CRT surface of a synchroscope shown in FIG. 10-a exemplifies the condition wherein the deviation of picture elements takes place between CCD25 and CCD27. Further, it is possible to obtain the relational position between CCDs that does not cause any deviation of picture elements by adjusting the fixing jig TC while checking through the synchroscope, and CCD25 and CCD27 are to be fixed on prism 22 at the image-forming position through the attaching member 24 (26), keeping aforesaid relational position.

Figure 11:
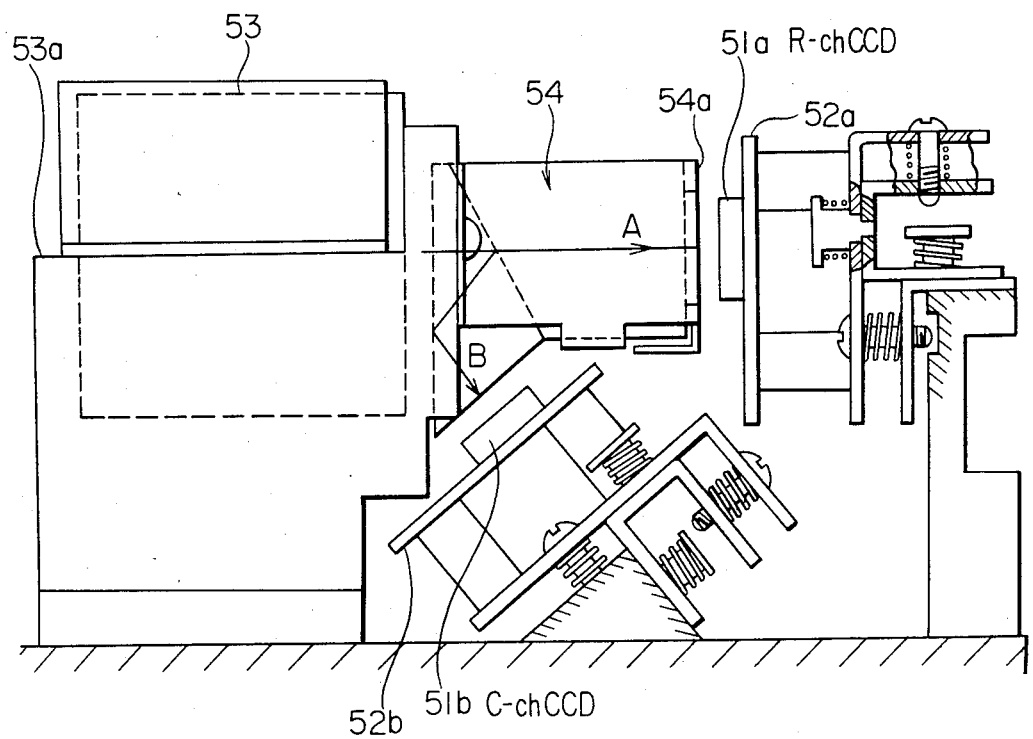
FIG. 11 is a sectional view showing the mechanism for attaching a conventional line image sensor.

Various comparative tests were made pertaining to the image-reading unit wherein a plurality of solid image-pick-up elements are fixed, through the attaching member employing ceramic materials, on the prism that is an optical member by the use of adhesives corresponding to FIG. 6 and to the image-reading unit wherein solid image-forming elements are retained by means of the mechanical constitution shown in FIG. 11. Tests were made, paying attention especially to the deviation of picture elements, in the way wherein a stripe chart was placed at the position for document and output signals from a plurality of solid image-pick-up elements provided were superposed on a synchroscope and compared.

(1) Vibration test

Vibration tests with variable frequency were made for 30 minutes and the conditions of the deviation of picture elements before and after the vibration tests were compared. Some of those having the mechanical structure corresponding to FIG. 11 showed a phenomenon wherein screws were loosened and the deviation of picture elements equivalent to about 4 picture elements (30 μm) took place. Deviation of picture elements was hardly observed on the one in the present example according to the invention.

(2) Impact test

Drop tests under 40G were made and the conditions of deviation of picture elements before and after the tests were compared. Some of those having the mechanical structure showed the deviation of picture elements equivalent to about 3 picture elements (20 μm). Deviation of picture elements was hardly observed on the one in the present example.

(3) Temperature test

Conditions for the deviation of picture elements were compared for 2 hours while raising the environmental temperature from 20° C. to 70° C. Some of those having the mechanical structure showed the deviation of picture elements equivalent to about 4 picture elements (30 μm). Then, the environmental temperature was restored from 70° C. to 20° C. during the period of 2 hours. Even after the restoration of the environmental temperature to 20° C., the residual deviation of picture elements equivalent to about 2 picture elements (15 μm) was observed on some of those having the mechanical structure. On the other hand, no deviation of picture elements was observed constantly on the one in the present example.

In the present invention, CCD is fixed on the prism through the attaching member, but the invention includes the occasion wherein CCD is fixed on the prism through the auxiliary attaching member fixed separately. FIG. 7 shows its example wherein the auxiliary attaching member 28 which is somewhat complicated in shape and is made of ceramic material is prepared because the prism is hard to be machined to be convex or concave, and it is glued on the prism 22 in advance. Due to the attaching member 24f (26f) fixed on the auxiliary attaching member 28, it is easy to fix CCD25 (27) at the adjusted position through the sliding guide in the direction of 'A' between the auxiliary attaching member 28 and the attaching member 24f (26f) and the guide in the rotating action in the direction of 'B'. FiG. 7-a is a front view and FIG. 7-b is a side view.

Next, as the second method for fixing R-ch CCD25 and C-ch CCD27 to the prism 22, the method wherein both of them are glued directly with adhesives and fixed is available.

FIG. 12 shows lens reading unit 20 constituted in the aforesaid manner and FIG. 13 shows primary portions of aforesaid unit.

FIG. 13-a shows an occasion wherein the periphery of CCD25 (27) is glued directly on the prism surface by filling adhesives. In this case, adhesives may be filled even to the picture element portion depending on the structure of CCD, therefore, it is necessary to pay attention when glueing. FIG. 13-b and FIG. 13-c show the examples wherein the disadvantages in FIG. 13-a are removed, and in FIG. 13-b, CCD itself has its attaching arms and is glued and fixed through its attaching arms on the sides or the front surface of the prism by means of adhesives. FIG. 13-c represents an attempt wherein a step is provided on the surface of prism and the higher surface of the step is made to be a attaching surface to which CCD is glued and fixed by means of adhesives. Though a prism is used as a light-separating member in all of theiillustrated examples, it is possible to fix a solid image-pick-up element directly at a image-forming position on a dichroic mirror by means of adhesives in the means of FIGS. 13-b and 13-c even in the case wherein the dichroic mirror is used as a light-separating member.

As shown in FIGS. 10-a and 12, CCD25 and CCD27 of the invention are glued to the prism 22 as follows. Namely, a checking tool and a fixing jig are prepared in advance. The checking tool is composed of a microscope checking for the position of the image-forming plane for the light images separated into separated light A and separated light B. Namely, it checks whether the position of light-receiving element of CCD corresponds with an image-forming position at the position being slightly away from the surface of the prism 22 where CCD is closely stuck to the prism 22 or slightyy away from the prism 12. For the aforesaid checking by the use of the checking tool, the distance between lens barrel 21 and prism 22 is to be adjusted by inserting washers between holding member 21a and attaching member 22a and then the difference between the distances from the prism surface to CCDs is to be removed by sliding the prism 22 in parallel against the lens barrel 21, for checking whether aforesaid conditions are satisfied or not.

Aforesaid fixing jig needs to be capable of adjusting in the directions of optical axes, two directions of x and y which are perpendicular to the optical axes respectively and rotating directions around x and y axes, relating to each optical axis of separated light A and B as shown in FIG. 9, while it is holding the sides of CCD25 and CCD27. Through the fine adjustment on the fixing jig TC, an adjustment for preventing the deviation of picture elements may be made as showm in FIG. 10-a.

An image of the chart having black and white stripes placed at the position for document is made to be formed on each of CCD25 and CCD27 and the output signals therefrom are superposed side by side and recorded on the synchroscope. When the pitch of black and white stripes is set in the chart from the designed reduction ratio by the condenser lens 21 and from the size of picture element of CCD so that a line of stripes corresponds to a picture element. it is possible to read easily an amount of the deviation of picture elements from the recorded signals superposed on the synchroscope. For example. the deviation of picture elements between CCD25 and CCD27 on the CRT surface of the synchroscope is exemplified in FIG. 10-a. Further, it is possible to obtain the relational position between CCDs that creates no deviation of picture elements by adjusting the fixing jig TC while checking by means of the synchroscope. and at the aforesaid position, both CCD25 and CCD27 are to be fixed on the surface of prism 22 by means of adhesives. Incidentally, in this case, the present method wherein the prism 22 is fixed on the holding member 21a by means of adhesives in advance and CCD25 and CCD27 are fixed directly while adjusting the positional relation between aforesaid one body consisting of holding member 21a and prism 22 and CCD mounted on the fixing jig TC is available and aforesaid first method wherein the fixing is made through attaching members 24 and 24a is also available and they provide effects that later processing steps are simple and the occurrence of inferiority is reduced. As a material of the holding member 21a in that case, ceramic and Invar alloy whose coefficients of linear expansion are small and close to that of prism 22 are preferable and Invar alloys are especially effective on the points of the cost and easiness in manufacturing. As adhesives, on the other hand, it is preferable to use those described previously.

Further, for the fixing in the second method, adhesives described previously may also be used and the results of the various comparative tests conducted after glueing and fixing in the second method proved to be identical to those obtained from the first method.

All of the above examples employ glueing as a fixing means and excellent effects produced from the glueing with special adhesives have been explained. However, the fixing means never be limited to the glueing. In FIGS. 8-a and 8-b, for example, prism 22 is held at its both sides by two sheets of attaching plates 24$_g$ made of alloy having a low coefficient of thermal expansion and is tightened with screw members 29 for fixing thereof. In this example, an internal stress caused by the tightening exists in each of CCD25 (27) aand other members and thereby the change with the passage of time tends to take place, which is the disadvantage in the example. In the aforesaid example, however, it is easy to remove and replace CCDs. Further, FIG. 10-b represents an example wherein a dust-proof packing P is arranged between the surface of prism 22 and CCD25 (27) so that the dust-proof pccking covers all elements of aforesaid CCD and fixed guiding pieces 24c and 24d are provided so that aforesaid dust-proof packing P may be fixed partially on the inside surfaces of attaching members 24a and 24b. In that case, when the dust-proof packing P is fixed on the contact surface of each of attaching members 24a and 24b by means of adhesives, more stability may be ensured. As stated above, when the dust-proof packing P is provided, neither toner in developer for recording nor paper dust from recording paper adhere to the portion between the prism 22 and CCD25 (27) and further to the light receiving portion of CCDs, and images continue to be stable for a long time. Furthermore, in all of the examples explained above, a prism is employed as a light-separating member, but the light-separating member is not limited to a dichroic prism and a color separation filter and the combination of aforesaid member and ND filter may also be employed.

Still further, in all of the examples explained above, the color separation into red (R) an cyan (C) has been adopted as one example of a optical separation into a plurality og lights.

The present invention is not limited to the above examples and, of course, is applicable to three colors separation into red (R), green (G) and blue (B) and so on.

When the light-separation member which is an optical member and a solid image-pick-up element are fixed at the image-forming position through a simple attaching member as in the case of the present invention, many causes for the deviation of picture elements are removed, thus, clear and excellent images are reproduced and obtained through the color image reading device and the deterioration of image quality caused by the deviation of picture elements under the environmental change and the passage of time does not take place, thereby the circuit for complicated electric compensation for the correction of aforesaid deviation of picture elements and of color ghost is not necessary and excellent durability may be ensured. As stated above in the examples of the invention wherein the filling adhesion is employed, the shrinkage during hardening of adhesives does not take place compared with a general filling adhesion because of the method that is close to the contact glueing. thereby. it is possible to attain a apparatus that ensures the image-reading which is very high in accuracy and is stable.

What is claimed is:

1. An image reading device for reading an image focused through a lens, said device comprising:
   (1) an optical separating means located between said lens and an image focusing point, said separating means having
      an incident surface for receiving image light introduced through the lens,
      a separating member for separting the incident image light into a plurality of image light components,
      projection surfaces for projecting the plurality of image light components to respective image focusing points, and
      side surfaces between said incident surface and said projection surfaces forming outer surfaces of said optical separating means,
   (2) a plurality of image reading means corresponding in number to said plurality of image light components,
   (3) fixing means for fixing each of siad plurality of image reading means so as to locate said reading means at a corresponding image focusing point for reading a corresponding focused component image, said fixing means having
      (a) an attaching member for connecting said plurality of image reading means to said outer surfaces of said optical separating means, said attaching member being capable of allowing each of said plurality of image reading means to move respectively so as to allow for the adjustment of a positional relation among said plurality of image reading means and a positional relation between each of said plurality of image reading means and a corresponding image focusing point, and
      (b) an adhesive material for fixing the connection among said outer surfaces, said image reading means and said attaching member.

2. The image reading device of claim 1, wherein there is further provided a lens unit for introducing an optical image into said optical separating means, and
   wherein said optical separating means is attached to said lens unit.

3. The image reading device of claim 2, wherein said lens unit comprises a lens and a lens barrel, and
   wherein said optical separating means is attached to said lens barrel.

4. The image reading device of claim 2, wherein said lens unit comprises a lens, a lens barrel and a supporting means, and
   wherein said optical separating means is attached to said supporting means.

5. The image reading device of claim 1, wherein said adhesive is a light-hardenable adhesive.

6. The image reading device of claim 5, wherein said light-hardenable adhesive is a ultraviolet ray-hadenable adhesive.

7. The image reading device of claim 1, wherein said attaching member is a glass material.

8. The image reading device of claim 1, wherein said attaching member is a material capable of transmitting a light therethrough and the adhesive is a light hardenable adhesive.

9. The image reading device of claim 8, wherein said light transmissible material is a glass material.

10. The image reading device of claim 1, wherein an attaching surface between said optical separating means and said attaching member is fixed with 1-liquid type adhesive and an attaching surface between said attaching member and said solid-state image-reading elemtns is fixed with 2-liquid type adhesive.

11. The image reading device of claim 1, wherein an attaching surface between said optical separating means and said attaching member is fixed with 1-liquid type adhesive and an attaching surface between said attaching member and said solid-state image-reading elemtns is fixed with light hardenable adhesive.

12. The image reading device of claim 1, wherein said attaching member is a ceramic material.

13. The image rading device of claim 1, wherein siad attaching member is an invar alloy.

14. The image reading device of claim 1, wherein siad attaching membr is an iron material.

15. The image reading device of claim 1,
wherein said attaching member connects said plurality of image reading means and said side surface of said optical separating means.

16. The image reading device of claim 15,
wherein each of said plurality of image reading means has a line image sensor comprising serially-arranged plural image reading elements, and
wherein said attaching member allows said image rading means to move so as to register the positional relation between the image reading elements corresponding to the respective component image separated from the image light.

17. The image reading device of claim 1 comprising at least two attaching members.

18. The image reading device of claim 1 wherein said fixing menas allows said image reading means to be adjusted in relation to said image focusing points rotationally and along each of an x, y and z axis.

19. The image reading of claim 1 wherein said attaching members are attached to said side surfaces of said optical separating menas and a front face of said image reading means, said front face being a surface substantially parallel and closest to said projection surface.

20. A method of forming an image reading device comprising an optical separating means which has a plurality of projection surfaes and a plurality of solid state image reading elemtns respectively located on the plurality of projection surfaces, said image reading elements being attached to attaching surface of said optical separating means with an adhesive, said method comprising
positioning said plurality of solid state image reading elements at respective fitting positions on said optical seaparting means.
applying an adhesive having delayed setting characteristics to at least one surface of the attaching member,
yieldably attaching the plurality of solid state image reading elements at predetermined positons on the optical separating means with said attaching member
correcting the fitted position of said plurality of solid state image reading elements, and
hardening the adhesive on the surfaces of said attaching member.

21. The method of claim 20 wherein an adhesive is applied to a first and second surface of said attaching member, a first surface for attaching said attaching member to said optical separating means and a second surface for attaching said attaching member to said image reading element.

22. The method of claim 21 wherein a light-hardenable adhesive is applied to said first and second surfaces of said attaching member.

23. The method of claim 21 wherein a two liquid type adhesive is applied to said first and second surfaces of said attaching member.

24. The method of claim 21 wherein a quick drying adhesive is applied to said first surface of said attaching member and said adhesive having delayed setting characteristics is applied to said second surface of said attaching member.

25. The method of cliam 20 wherein said first surface of said attaching member is attached to said optical separating member and said second surface is attached to said solid state image reading elements.

* * * * *